United States Patent [19]
Antoun

[11] Patent Number: 5,848,862
[45] Date of Patent: Dec. 15, 1998

[54] BORING BAR WITH REVERSE MOUNTED INSERT

[76] Inventor: Gregory S. Antoun, 25 W. High St., Union City, Pa. 16438

[21] Appl. No.: 881,596

[22] Filed: Jun. 24, 1997

[51] Int. Cl.$^6$ .................................................. B23B 51/00
[52] U.S. Cl. .......................... 408/199; 408/200; 408/233; 408/713; 407/48; 407/103
[58] Field of Search ..................... 407/48, 103; 408/199, 408/187, 200, 227, 233, 713

[56] References Cited

U.S. PATENT DOCUMENTS

| | | |
|---|---|---|
| 3,963,365 | 6/1976 | Shallenberger, Jr. . |
| 4,230,429 | 10/1980 | Eckle . |
| 4,279,550 | 7/1981 | Kress et al. . |
| 4,367,991 | 1/1983 | Grafe et al. . |
| 4,527,930 | 7/1985 | Harroun ..................................... 407/48 |
| 4,648,760 | 3/1987 | Karlsson et al. ......................... 408/713 |
| 4,659,264 | 4/1987 | Friedline . |
| 4,850,757 | 7/1989 | Stashko . |
| 5,156,503 | 10/1992 | Tsujimura et al. . |
| 5,160,228 | 11/1992 | Arai et al. .................................. 407/48 |
| 5,259,707 | 11/1993 | Keller . |
| 5,261,767 | 11/1993 | Tsujimura et al. . |
| 5,340,246 | 8/1994 | Tukala . |
| 5,704,736 | 1/1998 | Giannetti ................................... 407/48 |

FOREIGN PATENT DOCUMENTS

| | | |
|---|---|---|
| 134112 | 10/1981 | Japan . |
| 2180177 | 3/1987 | United Kingdom . |

*Primary Examiner*—Daniel W. Howell
*Assistant Examiner*—Adesh Bhargava
*Attorney, Agent, or Firm*—Richard C. Litman

[57] ABSTRACT

A boring bar includes an insert pocket formed on the back side of a relief in the working end of the bar, for the removable installation of a cutting insert therein. The insert pocket may be formed to provide a positive rake angle for the insert installed therein, relative to the axis of the bar, and further may include a positive angle relative to the radius of the bar as well. The force imparted to the insert as the bar is forced against the workpiece, tends to force the insert upwardly and inwardly into the pocket of the bar, thus assisting in holding and securing the insert to the bar. The bar is also thicker at the upper portion of the insert pocket than at the lower portion of the pocket, thus providing additional strength and stiffness to the bar in this critical area to reduce the possibility of chatter and breakage of the bar. Either the tool moves and the workpiece is stationary, or the workpiece moves and the tool is stationary.

14 Claims, 5 Drawing Sheets

FIG. 1

BORING BAR WITH REVERSE MOUNTED INSERT

BACKGROUND OF THE INVENTION

1. Field of the Invention

The present invention relates generally to machine tools, equipment, and operations, and more specifically to a boring bar or similar rotating or stationary tool for use in forming holes in workpieces. The bar includes an insert pocket formed on the front side of a relief in the working end of the bar, for the removable installation of a cutting insert therein. The insert pocket may be formed to provide a positive rake angle for the insert installed therein, relative to the axis of the bar, and further may include a positive angle relative to the radius of the bar as well. The force imparted to the insert as the bar is forced against the workpiece, tends to force the insert upwardly and inwardly into the pocket of the bar, thus assisting in holding and securing the insert to the bar. The bar is also thicker at the upper portion of the insert pocket than at the lower portion of the pocket, thus providing additional strength and stiffness to the bar in this critical area to reduce the possibility of chatter and breakage of the bar.

2. Description of the Related Art

Cutting inserts used in machining operations are conventionally mounted to the tool so as to have a positive rake angle, i. e., having the cutting edge of the insert disposed at least slightly forwardly of the opposite, non-cutting edge. This positive rake angle provides more positive cutting action, rather than a dragging or scraping action which would occur with a negative insert angle. Accordingly, conventional boring bars include a relief formed in the advancing side or portion of the bar, to which the cutting insert is bolted or otherwise removably affixed.

However, the formation of such a relief in the advancing side of the bar, along with the need for positive rake for the cutting insert, results in the top of the relief, i. e., the portion of the relief opposite the cutting edge of the insert, being wider than the bottom portion of the relief. In other words, the solid portion of the bar behind the relief is thinner behind the uppermost portion of the relief, than at the lowermost or outermost edge of the relief. This is not desirable, as the drag force imparted to the insert during cutting operations imparts a considerable bending load upon the uppermost or innermost end of the bar material behind the relief, which may lead to instability of the bar at that point if excessive pressure is applied during machining.

Also, the relatively narrow "neck" of the thinner bar portion can flex to a slight degree, and may set up a harmonic vibration (known as "chatter"), depending upon the material being worked, the force applied to the workpiece by the bar and insert, the cutting speed, the sharpness of the insert, and lubrication during the machining operation. Such chatter can cause the bar and workpiece to attain a cyclic motion which exceeds the tolerances desired for the particular operation, thus ruining the workpiece, or may lead to the insert jamming or binding within the workpiece. It can be seen that the larger the positive rake angle, the narrower the "neck" of the relief area. This has limited the rake angle of cutting inserts with conventional boring bars to around five degrees as measured from the axis of the bar. This has also resulted in the extension of conventional bars being limited to about four times the bar diameter, particularly in smaller diameter boring bars.

Heretofore, alternative means of mounting the insert to the bar have not been considered, due to the desirability of providing a solid backing for the insert. Thus, machinists have lived with the problems described above in order to have the desired positive rake for the insert when mounted within the relief of a boring bar. It has not been considered possible to have a durable mounting for an insert while providing a relief to the trailing portion or side of the bar and mounting the insert thereto, as the forces involved in the cutting operation would create tensile forces between the insert and bar, and would tend to tear the insert loose from the bar.

Accordingly, a need will be seen for a boring bar having a reverse relief for mounting a cutting insert thereto, and including means for providing positive pressures to the insert relative to the bar and insert in order to provide better mounting security for the insert. The present bar includes a reverse relief having a pocket formed therein, into which the insert is forced during normal machining operations to impart a positive pressure between the insert and the bar, just as in a bar having an insert relief formed in the advancing portion of the bar. The present bar can provide a significantly greater positive rake angle for the insert, such as ten degrees or more, which provides even greater positive forces to force the insert into the relief and relief pocket. Positive radial rake may also be provided using the present reverse insert mounting relief. A discussion of the related art of which the present inventor is aware, and its differences and distinctions from the present invention, is provided below.

U.S. Pat. No. 3,963,365 issued on Jun. 15, 1976 to Fred T. Shallenberger, Jr. describes a Drill With Indexable Inserts, with two inserts affixed to a single boring bar. The configuration is asymmetric, with one of the inserts having a negative radial angle (i. e., the inner corner is positioned ahead of the outer corner), and the other having no positive or negative radial angle. Both inserts have negative axial rake, whereas the single insert of the present boring bar has a positive axial rake. No pockets are provided for the inserts of the Shallenberger, Jr. drill, and the inserts are not reverse mounted, as in the present boring bar.

U.S. Pat. No. 4,230,429 issued on Oct. 28, 1980 to Otto Eckle describes a Boring Tool For Making Borings In solid Metal Material Of Workpieces. The drill shank or boring bar includes up to three separate cutting inserts thereon, with each of the inserts spaced radially a different distance from the axis of the bar. No positive axial or radial rake or angular offset is provided for any of the inserts, however, as a review of FIG. 2 of the Eckle patent shows, and the inserts are positively mounted, i. e., in front of the advancing wall of the reliefs formed in the bar, unlike the reverse insert mounting of the present bar.

U.S. Pat. No. 4,279,550 issued on Jul. 21, 1981 to Dieter Kress et al. describes a Deep Hole Boring Tool With Replaceable Blade, wherein the boring bar includes a cutout portion against which the cutting insert is seated. A clamp is bolted in place over the inner portion of the blade (i. e., the portion toward the central axis of the bar) to hold the blade in place. Further adjusting screws are also provided to adjust the radial positioning of the insert. No hole or passage is provided through the Kress et al. insert to allow the insert to be bolted directly to the bar, as in the present invention. The Kress et al. bar does not provide any axial or radial rake for the insert, which rake is provided by the present boring bar and insert. Moreover, the insert is backed by the advancing wall of the relief, rather than being affixed behind the solid portion of the bar and in front of the relief, as in the present invention.

U.S. Pat. No. 4,367,991 issued on Jan. 11, 1983 to Werner Grafe et al. describes a Boring Tool including two specially formed inserts, with the inserts each being positioned at a different radial distance from the center of the boring bar. The inserts are each conventionally mounted to the advancing side of the solid portion of the bar, i. e., to the trailing side of the reliefs of the bar, unlike the reverse insert mounting of the present invention.

U.S. Pat. No. 4,659,264 issued on Apr. 21, 1987 to Ernest J. Friedline describes a Drill And Indexable Carbide Insert. Therefor, with the insert being describes as having a first cutting edge with a negative radial rake and a second cutting edge with a negative axial and positive radial rake. However, the insert itself is a flat plate with parallel forward and rear surfaces, and is disposed conventionally to the front surface of the solid portion of the boring bar, to the rear of the relief, with no radial or axial rake angle, unlike the present invention.

U.S. Pat. No. 4,850,757 issued on Jul. 25, 1989 to Daniel R. Stashko describes a Rotary Cutting Tool providing radial adjustment for the cutting insert thereof. The insert has a negative radial rake angle, rather than the positive angle of the present boring bar and insert. Also, the insert is held conventionally against the advancing face of the solid portion of the bar, trailing the relief area of the bar, opposite the reverse mounting of the insert of the present bar.

U.S. Pat. No. 5,156,503 issued on Oct. 20, 1992 to Osamu Tsujimura et al. describes a Boring Bar Tool having an insert with a positive axial rake angle. However, the insert is conventionally mounted within the trailing portion of the relief formed in the bar, to the leading wall of the solid portion of the bar. Several drawing figures clearly show the relatively thinner area of the solid portion of the bar adjacent the upper end of the relief, when such positive axial rake is provided with a conventionally mounted insert. The reverse mounting of the present insert obviates this problem, with the insert recess or pocket formed in the trailing wall of the solid portion of the bar serving to secure the insert solidly to the bar. Moreover, Tsujimura et al. do not provide any positive radial rake for their insert, which positive radial rake is provided in the present invention.

U.S. Pat. No. 5,259,707 issued on Nov. 9, 1993 to Dale L. Keller describes a Spot Drill With Indexable Replaceable Insert. The insert is centered in a slot in the end of the drill, with a relief providing for bolting the insert in place. About half of the insert extends into the relief side of the drill, with that portion of the insert being conventionally clamped in place against the advancing wall of the solid portion of the drill behind the relief. This is opposite the present reverse mounted insert. Also, Keller does not provide any axial or radial rake for his insert, which rake angles are provided by the present boring bar and insert.

U.S. Pat. No. 5,261,767 issued on Nov. 16, 1993 to Osamu Tsujimura et al. describes a Boring Bar Tool similar to the tool disclosed in the '503 patent to the same inventors, discussed further above. The same differences and distinctions described above between the '503 patent and the present invention, also apply here.

U.S. Pat. No. 5,340,246 issued on Aug. 23, 1994 to Tommy Tukala describes an Indexable Insert Drill And An Insert With A Symmetrical Drill Point And Cutting Edges Of Different Lengths. While Tukala describes at least one edge of the two inserts as having a small positive radial rake angle, the inserts themselves are affixed in the end of the drill stem or boring bar with no axial or radial rake angles. As in the case of the other boring tools discussed above, Tukala secures his inserts conventionally to the front wall of the solid portion of the drill or bar, trailing their respective reliefs. The present boring bar inserts are reverse mounted, to the trailing wall of the solid portion of the bar in front of the relief as the bar rotates.

Japanese Patent Publication No. 56-134,112 published on Oct. 20, 1981 illustrates a Clamp Type Boring Tool having a convex shaped peripheral edge for each of the two inserts secured thereto. No radial or axial rake angle is apparent in the drawings, and each of the inserts is conventionally secured to the leading wall of the solid portion of the boring bar, trailing their respective reliefs, unlike the present bar with its single insert reverse mounted to the rear wall of the solid portion of the bar.

Finally, British Patent Publication No. 2,180,177 published on Mar. 25, 1987 describes Improvements In Or Relating To The Mounting Of Tool Blades, wherein the inserts are each provided with a groove which engages a retaining pin. The retaining pin prevents the inserts from falling from their respective channels in the event that the clamping bolts fail. The end view of FIG. 3 clearly shows that while a positive radial rake angle is provided for each insert, no axial rake angle is provided. The inserts reside in channels formed in the end of the boring bar, rather than being secured to the trailing face of the solid portion of the bar, at the advance portion of the relief of the cutting end of the bar, as provided by the present invention.

None of the above inventions and patents, either singly or in combination, is seen to describe the instant invention as claimed.

SUMMARY OF THE INVENTION

The present invention comprises a boring bar having a cutting insert which is removably affixed within a relief formed in the working end of the bar, with the insert being attached to the trailing face of the solid portion of the bar, adjacent the leading portion of the relief. An insert pocket or recess is formed in the trailing portion of the solid portion of the bar, into which the insert is removably secured. The tapered edges of the insert, which provide cutting edges, also provide for the insert to be captured securely within the pocket or recess. The insert is forced upwardly into the recess by normal forces during operation.

Accordingly, it is a principal object of the invention to provide an improved boring bar providing for the reverse mounting of a cutting insert therein, and including a reverse mounted cutting insert.

It is another object of the invention to provide an improved boring bar including a pocket or recess formed in the trailing face of the solid portion of the bar, immediately in front of the leading portion of the relief formed in the working end of the bar.

It is a further object of the invention to provide an improved boring bar which insert is tapered on all edges to provide sharp cutting edges, with the pocket or relief of the bar being formed to fit closely about the tapered edges of the insert, thereby capturing the insert positively about a plurality of its edges.

An additional object of the invention is to provide an improved boring bar which insert is forced upwardly into the recess by normal forces developed during machining operations, which forces assist in holding the insert in place on the bar.

Still another object of the invention is to provide an improved boring bar which insert may have positive axial and/or radial rake, for better cutting efficiency.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a boring bar for machine work, with the bar having a reverse mounted cutting insert removably secured thereto, i. e., with the insert secured to the rear or trailing portion of the solid portion of the bar, in front of the relief portion of the bar relative to the direction of rotation of the bar when in operation.

Figure 1:
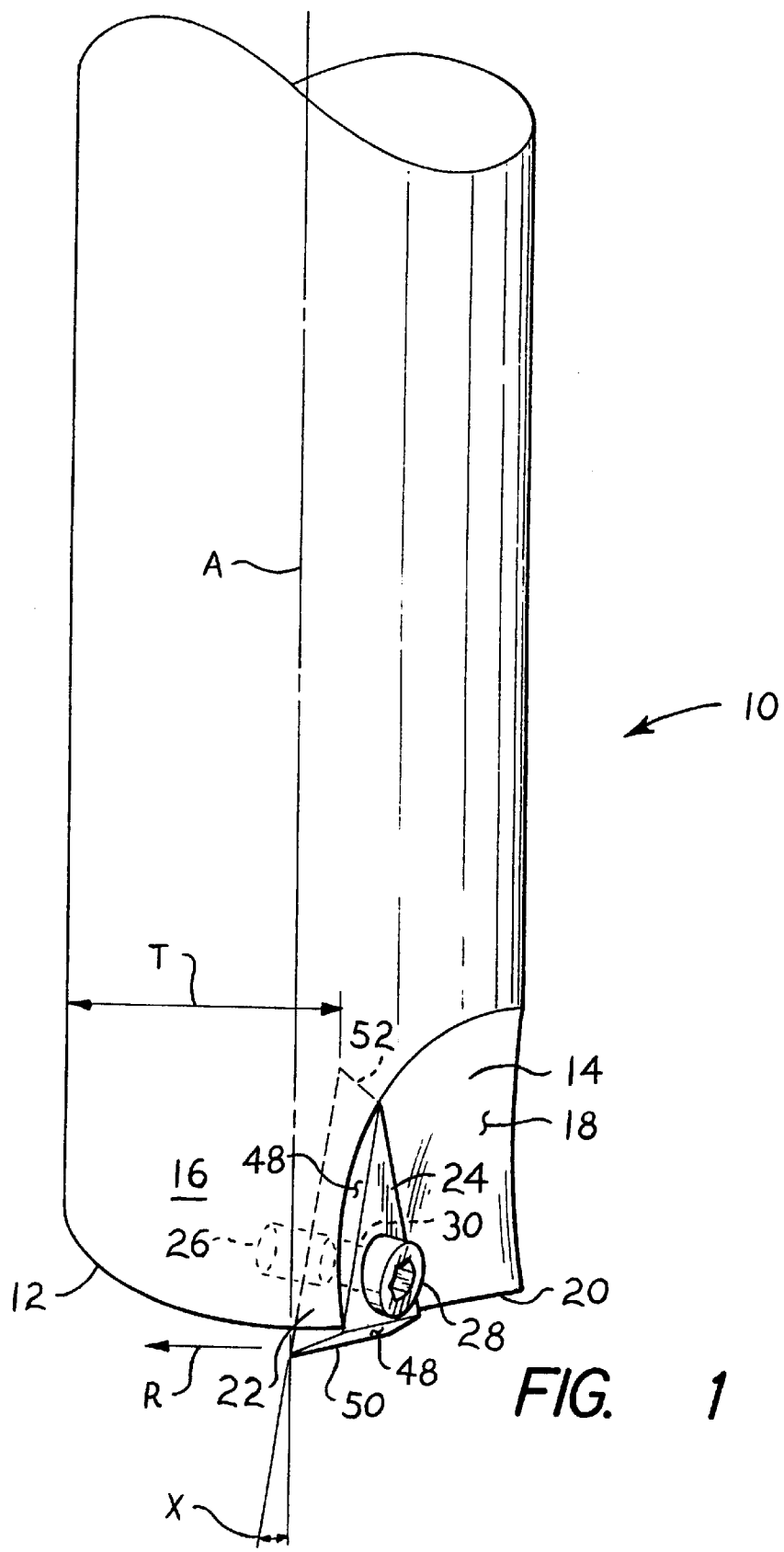
FIG. 1 is a side elevation view of the boring bar and insert of the present invention, showing the positive axial rake angle which may be provided for the insert.

FIG. 1 provides a side elevation view of the present boring bar, designated by the reference numeral 10. The bar 10 essentially comprises a rotary shaft having a rotary axis A, with the normal direction of rotation designated by the directional arrow R in each view. The bar 10 includes a conventional tool attachment end (not shown in the drawings) and an opposite working end 12, with the working end 12 having a relief 14 formed therein. The relief portion 14 forms a truncated cutout in the solid portion 16 of the working end 12 of the bar 10, with the solid portion 16 having a flat, planar relief surface or wall 18 adjacent the relief 14.

Due to the rotation of the bar 10 when in operation, it will be seen that the relief surface 18 of the solid portion 16 of the bar 10 will have a trailing portion 20 generally to one side of the axis A which trails the solid portion 16 in the direction of rotation, and a laterally opposite leading portion 22. A cutting insert 24 is removably secured to this back or trailing portion 20 of the relief wall or surface 18, so that the insert 24 is positioned to the front side or portion of the relief 14, relative to the direction of rotation of the bar 10 or workpiece when in operation.

The trailing or rear portion 20 of the solid portion 16 of the bar 10 includes some form of insert attachment means therein, such as the threaded hole 26 formed therein (FIG. 3) and providing for the removable attachment of a cutting insert attachment bolt 28 (FIGS. 1 and 2) therein. The insert 24 includes an insert bolt attachment passage 30 formed generally centrally therethrough.

Figure 2:
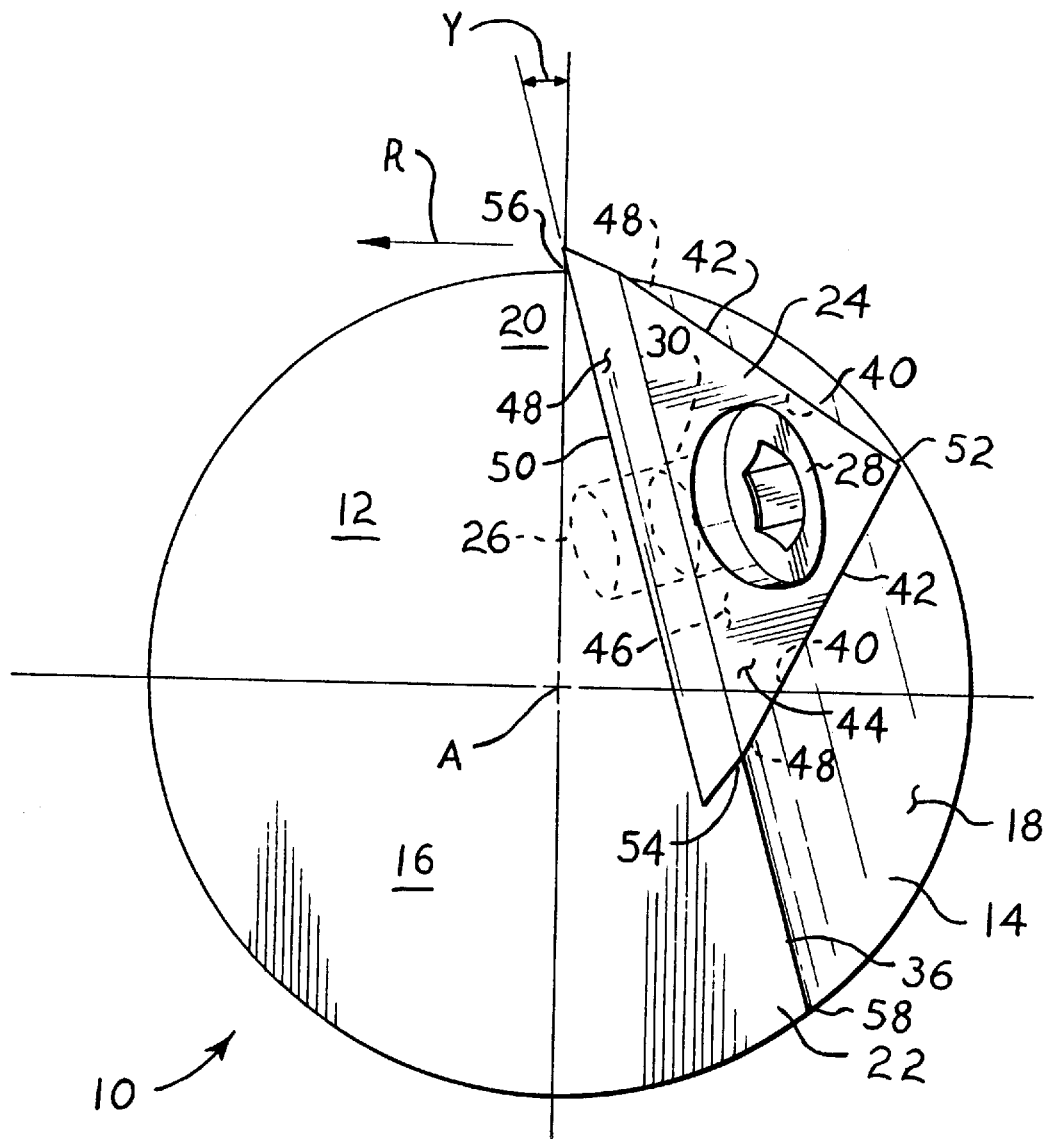
FIG. 2 is a bottom or working end plan view of the present bar and insert, showing the positive radial rake angle which may be provided for the insert.
Figure 3:
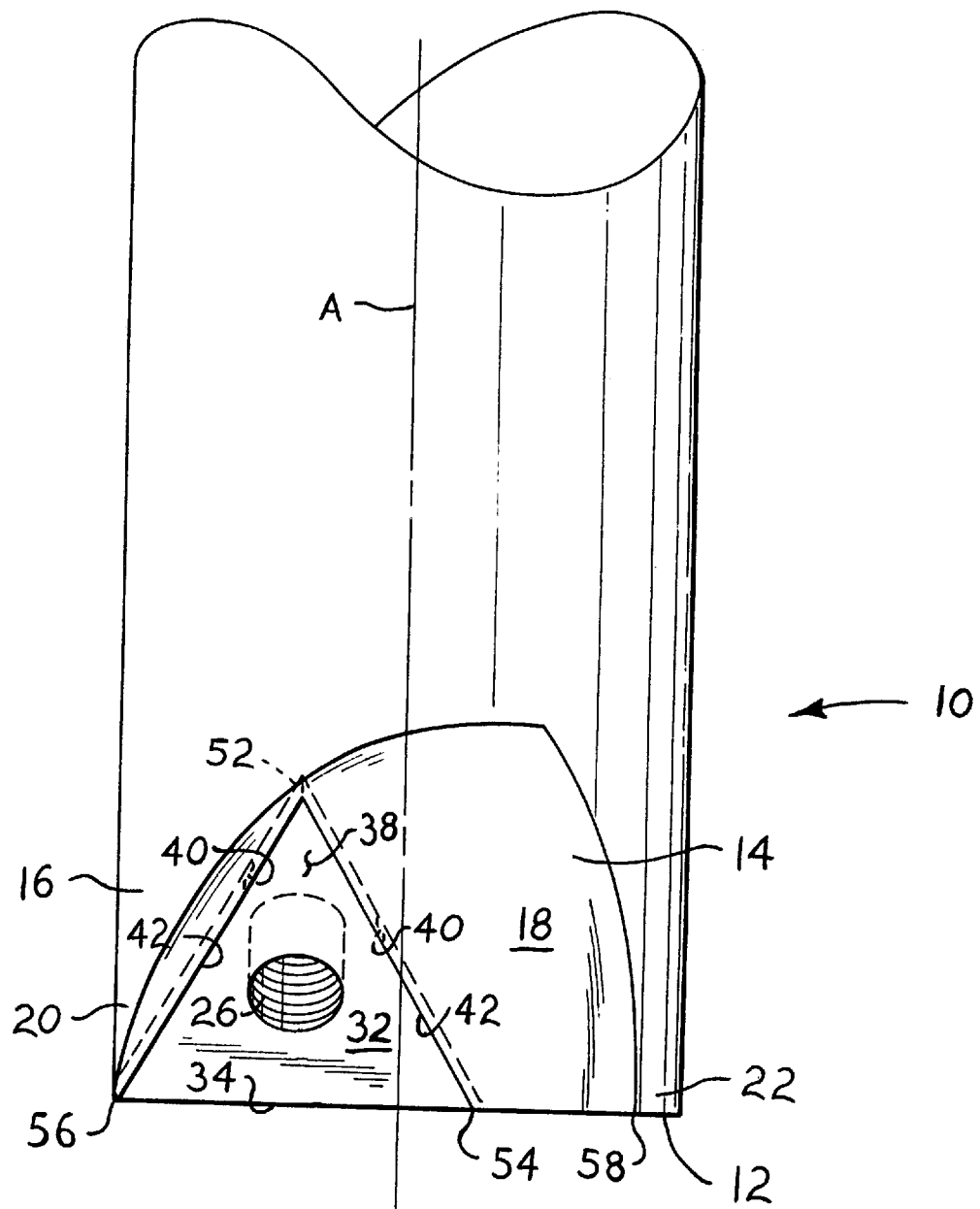
FIG. 3 is a rear elevation view of the present bar with the insert removed, showing the insert recess formed in the trailing portion of the solid part of the working end of the bar.

Additional security for the attachment of the insert 24 to the rear portion 20 of the solid portion 16 is provided by a cutting insert pocket 32 which is formed within the relief surface 18, with the pocket 32 having a base 34 which extends across at least the trailing portion of the relief surface 18 (and preferably past the center of the relief surface 18, to encompass slightly more than half of the lower edge 36 of the relief surface 18, as shown in FIG. 2). The insert pocket 32 is most clearly shown in FIG. 3.

The insert pocket 32 has a flat, planar face 38 which is parallel to the flat, planar surface of the truncated relief surface 18. The insert pocket face 38 is defined by the base edge 34 and a plurality of sides 40 (preferably two, which along with the base edge 34 define a triangular pocket 32). It will be seen in FIGS. 2 and 3 that the two sides 40 slope inwardly from the pocket face 38, thereby defining an insert pocket upper edge 42 which is narrower than the pocket face 38.

The cutting insert 24 is congruently shaped to the insert pocket 32, having an outer face 44, an opposite inner face 46 which is somewhat wider than the outer face 44 and which is in contact with the insert pocket face 38 when the insert 24 is installed within the pocket 32, and a plurality of sides 48 which slope from the narrower outer face 44 to the wider inner face 46. These sloping sides 48 serve to wedge beneath the inwardly sloping sides 40 of the insert pocket 32 when the insert 24 is installed within the pocket 32, thus precluding removal of the insert 24 in a direction normal to the face 38 of the insert pocket 32.

It will be seen that as the boring bar 10 engages a workpiece (not shown), that a compressive force will be applied to the cutting insert 24 as the cutting edge 50 which extends slightly below the bottom end of the working end 12 of the bar 10 engages the workpiece, e.g., if the boring bar 10 is lowered vertically to engage a workpiece positioned therebelow as in the boring bar orientation of FIG. 1. This compressive force of the cutting edge 50 of the insert 24 against the workpiece, also imparts a compressive force to the insert 24 upwardly into the insert pocket 32, thus wedging the insert 24 more securely into the pocket 32 due to the overhanging upper edges 42 of the inwardly tapered insert pocket sides 40, which capture and securely hold the mating shape of the cutting insert 24 therein. Thus, secure installation of the insert 24 to the bar 10 is achieved by means of only a single insert attachment bolt 28, even though the insert 24 is secured to the trailing portion 22 of the solid portion 16 of the working end 12 of the bar 10, rather than to the forward portion of the solid portion of the bar, as in the prior art.

Preferably, the two sides 40 and the base 34 of the insert pocket 32 are all equal in length, so that the shape of the insert pocket face 38 forms an equilateral triangle. While the insert 24 is also preferably in the shape of an equilateral triangle, it will be seen that the sides 48 of the insert 24 are slightly longer than the sides 40 of the insert pocket 32, thus causing the lowermost side of the insert 24 to protrude from the extreme end of the working end 12 of the bar 10, to expose the cutting edge 50.

As the insert 24 is preferably an equilateral triangle, or at least a regular polygon, it will be seen that when the cutting edge 50 of the insert 24 is dulled, the insert 24 need only be removed from the pocket 32 and turned to position a different cutting edge projecting outwardly past the base 34 of the pocket 32, and again secured within the pocket 32. Also, while the insert 24 depicted in the drawing figures comprises an equilateral triangle shape of slightly larger dimensions than the equilateral triangular pocket 32, it will be seen that other shapes (square, rectangular, etc.) may be used for the pocket and insert, if so desired.

As noted above, the relief surface 18 defining the interface between the solid portion 16 and the relief portion 14 of the working end 12 of the bar 10 preferably forms a flat, planar surface which at least partially truncates the working end 12 or the bar or shaft 10. As the insert pocket 32 is formed with its pocket face 38 parallel to the angled relief surface 18, it will be seen that the pocket face 38 and insert pocket 32 have the same angle or slope as the relief surface 18, i. e., a positive axial rake angle X (shown in FIG. 1), with the base 34 of the pocket 32 disposed forwardly of the upper end 52 of the pocket 32 relative to the direction of rotation R of the bar or shaft 10 about its axis A. In other words, it will be seen in FIG. 1 that the outer lower corner 54 of the insert 24 is positioned essentially in alignment with the axis A of the bar 10, thus providing the upper portion of the solid portion 16 of the bar 10 with a relatively greater thickness, as indicated by the arrow T in FIG. 1.

Such positive axial rake is desirable in cutting operations, as it positions the insert cutting edge to cut, rather than scrape, along the workpiece surface. However, conventional prior art: boring bars, such as the bar B of FIG. 4, have achieved such positive axial rake in the direction of rotation R2 by thinning the upper solid portion S, as indicated by the thickness arrow T2 in FIG. 4, in order to provide the required rearward displacement of the upper end E of the insert I. While this provides the desired positive axial rake angle, the relative thinness of the upper solid portion behind the relief tends to restrict the cutting force which can be applied to the bar, and may permit the working end of the bar to vibrate harmonically or "chatter." Generally speaking, the unsupported extended length of such a bar B is limited to about four times the diameter of the bar, which restricts the depth of holes being bored using such a conventional bar B. This problem is particularly significant with relatively small diameter bars, and in any case the positive axial rake angle is severely limited, generally to no more than about five degrees.

Figure 4:
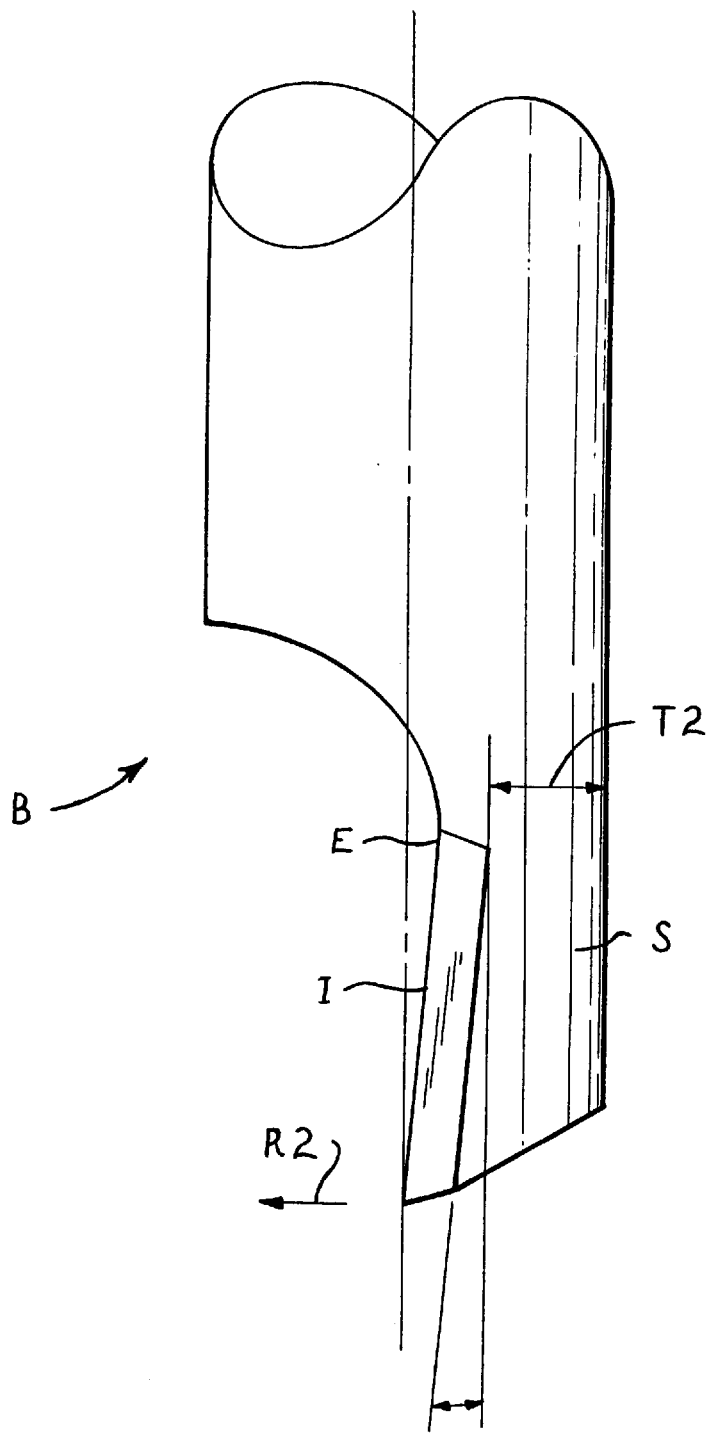
FIG. 4 is a prior art boring bar, showing the attachment of the insert to the forward face of the solid portion of the bar, trailing the relief.
Figure 5:
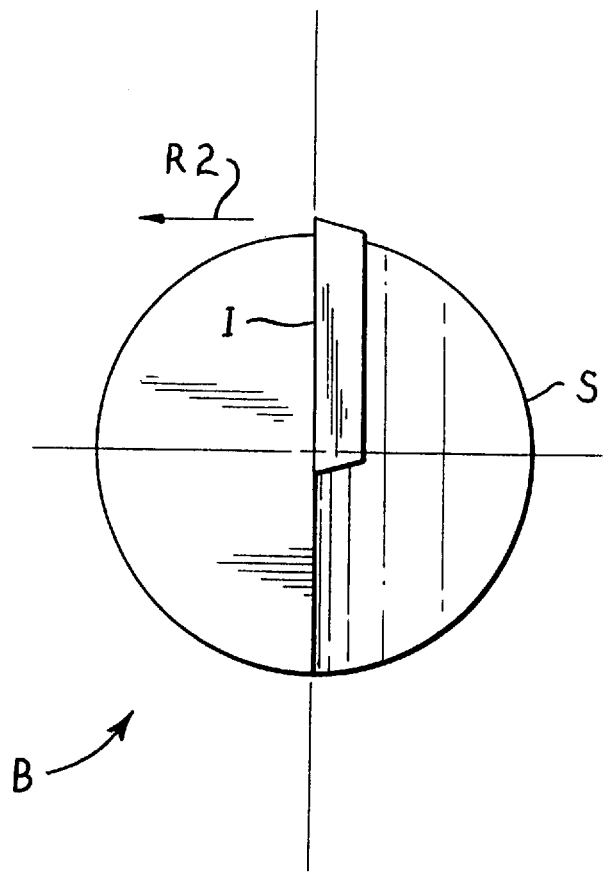
FIG. 5 is a bottom or working end plan view of the prior art bar of FIG. 4, showing the forward mounting of the insert to the solid portion of the bar.

The relative thinness of the upper portion of such a bar B, further restricts the provision of any radial rake angle for the insert I, as shown in the prior art bar B of FIG. 5. An examination of this Figure, taken with prior art FIG. 4, will show that further thinning of the solid portion S of the bar B to provide such an axial rake angle, in combination with the thinning of the upper portion of the solid portion S as shown in FIG. 4, will make the upper portion of the solid portion S dangerously thin.

The present bar 10, with its cutting insert 24 being secured to the working end 12 of the bar 10 to the trailing portion of the solid portion 16, obviates such problems. In fact, further rearward inclination of the upper end 52 of the insert 24, or rearward displacement of the lower inboard corner 54 of the pocket 32, results in the solid portion 16 of the working end 12 of the bar 10 being thicker than if no such angular rake were provided, thus strengthening the bar 10 when axial and radial rake is provided for the insert 24.

FIG. 2 provides a view of the bottom end of the present boring bar 10, showing such a positive radial rake angle for the pocket 32 and insert 24 secured therein. In FIG. 2, it will be seen that the lower edge 36 of the relief surface 18 defines a secant extending across the bottom of the bar working end 12. This lower edge secant 36 has a forward end 56 relative to the direction of rotation of the bar 10 or workpiece, which secant forward end 56 commonly located with the lower outboard corner of the insert pocket 32, and an opposite rearward end 58. As the secant 36, and thus the insert pocket 32 and insert 24 secured therein, do not pass through the central rotational axis A of the bar shaft 10, but rather pass behind the axis A at an angle Y relative to the direction of rotation, it will be seen that the insert 24 has a positive angular rake relative to the radius of the bar 10, i. e., the outboard corner 56 of the relief surface lower edge and secant 36, and thus the corresponding corner of the insert 24, is advanced ahead of the opposite lower insert corner at the inboard pocket corner 54.

In summary, the present boring bar 10 with its reverse mounted insert 24, provides a significant advance in machining technology. Heretofore, it was not considered possible to mount an insert to the rear of the solid portion of the working end of a boring bar, as it was thought that the forces imparted during machining operations would quickly deflect the insert and that the insert could not be retained immovably relative to the bar for precise machining operations. The present bar 10, with its insert pocket 32 formed in the back of the solid portion 16 and in front of the relief portion 14 of the working end of the bar 10, has the insert 24 disposed oppositely to boring bars of the prior art. The present bar 10 is successful due to the positive capturing of the insert 24 within the pocket 32, by means of the inwardly extending or overhanging edges of the pocket 32 which capture the similarly formed insert 24 therein. With the securing of the insert 24 within the pocket 32 by a single insert attachment bolt 28, the insert 24 is immovably affixed to the bar 10 within the pocket 32.

The provision of positive axial and radial rake angles for the insert 24 need no longer weaken the working end of the bar, as is the case with conventional bars having forwardly mounted inserts as shown in prior art FIGS. 4 and 5. In fact, such positive rake angles result in the solid portion of the present bar 10 adjacent the relief portion, actually being thicker and stronger than would be the case with no rake angle being provided. Moreover, such rake angles actually assist in forcing the insert 24 more securely into the pocket due to the operative forces incurred during machining.

Accordingly, the present boring bar 10 may provide greater rake angles, which can greatly exceed the five degree limitation generally accepted with conventional boring bars. The thicker solid portion 16 in the working end 12 of the bar 10 results in the deflection of the bar being greatly reduced, which means that the extended length of the bar may be on the order of twice that of the conventionally accepted limit of four times the bar diameter. Harmonic vibration or "chattering" is also greatly reduced by the present bar with its reverse mounted insert, which allows higher cutting speeds and greater working forces to be developed during machining, depending upon the material being machined. The provision of coolant passages will also be seen to be improved, as they may be placed directly in front of the working edge of the insert for greater efficiency. The faster speeds and greater efficiency achieved by the present boring bar with its reverse mounted insert will provide a significant reduction in time spent in such operations by machinists, thus improving their efficiency and the profitability of their operations.

It is to be understood that the present invention is not limited to the sole embodiment described above, but encompasses any and all embodiments within the scope of the following claims.

I claim:

1. A boring bar, comprising:

a rotary shaft having a rotary axis, a direction of rotation therearound, and a working end;

said working end including a solid portion and a truncated relief portion, with said solid portion having a relief surface adjacent said relief portion;

said relief surface having a trailing portion relative to said direction of rotation disposed to one side of said axis and a leading portion disposed laterally opposite said trailing portion; and said relief surface including a cutting insert pocket formed therein, said insert pocket having an upper end and a face defined by a plurality of sides and a base extending across at least said trailing portion of said relief surface, each of said sides sloping inwardly with respect to said face to define an upper edge which is narrower than said face, said base disposed forwardly of said upper end to provide a positive axial rake angle, said insert pocket for removably retaining a cutting insert in a position rearwardly of said solid portion and forwardly of said relief portion relative to said direction of rotation of said rotary shaft and having said positive axial rake angle; whereby a compressive force is provided by rotation of said shaft which securely holds the cutting insert within said insert pocket.

2. The boring bar according to claim 1, wherein said relief surface has a lower edge defining a secant of said working end of said shaft, with said lower edge having a forward end and an opposite rearward end, and said insert pocket includes a lower outer corner and opposite lower inner corner disposed along sail lower edge of said insert pocket, with said lower outer corner disposed forwardly of said lower inner corner for providing a positive radial rake angle for a cutting insert installed therein.

3. The boring bar according to claim 1, wherein said insert pocket includes a threaded hole generally centrally disposed therein, for removably accepting a cutting insert attachment bolt therein.

4. The boring bar according to claim 1, wherein said insert pocket is polygonal.

5. The boring bar according to claim 1, wherein said insert pocket is triangular.

6. The boring bar according to claim 1, wherein said sides and said base of said insert pocket are equal in length to one another, with said insert pocket forming an equilateral triangle.

7. A boring bar, comprising:

a rotary shaft having a rotary axis, a direction of rotation therearound, and a working end;

said working end including a solid portion and a truncated relief portion, with said solid portion having a relief surface adjacent said relief portion;

said relief surface having a trailing portion relative to said direction of rotation disposed to one side of said axis and a leading portion disposed laterally opposite said trailing portion;

a cutting insert; and said relief surface including cutting insert attachment means having a cutting insert Docket formed therein having a base extending across at least said trailing portion of said relief surface;

said insert pocket having an upper end and a face defined by a plurality of sides and said base;

each of said sides of said insert pocket sloping inwardly with respect to said insert pocket face to define an insert pocket upper edge which is narrower than said insert pocket face, for providing a compressive force to said cutting insert installed within said insert pocket for securely holding said cutting insert within said insert pocket;

cutting insert attachment means disposed within said cutting insert pocket, for removably securing said cutting insert within said cutting insert pocket and for removably attaching said cutting insert thereto and for positioning said cutting insert rearwardly of said solid portion and forwardly of said relief portion relative to said direction of rotation of said rotary shaft;

said cutting insert having a shape to fit closely within said insert pocket and including an outer face and an inner face wider than said outer face, with a plurality of sloping sides extending between said outer face and said inner face for fitting closely within said inwardly sloping sides of said insert pocket, and a base cutting edge depending at least slightly from said insert pocket and below said working end of said shaft.

8. The boring bar according to claim 7, wherein said relief surface comprises a flat plane partially truncating said working end of said shaft, and said base of said insert pocket is disposed forwardly of said upper end of said insert pocket for providing a positive axial rake angle for said cutting insert installed therein.

9. The boring bar according to claim 7, wherein said relief surface has a lower edge defining a secant of said working end of said shaft, with said lower edge having a forward end and an opposite rearward end, and said insert pocket includes a lower outer corner and opposite lower inner corner disposed along said lower edge of said insert pocket, with said lower outer corner disposed forwardly of said lower inner corner for providing a positive radial rake angle for said cutting insert installed therein.

10. The boring bar according to claim 7, wherein said insert pocket includes a threaded hole generally centrally disposed therein for removably accepting a cutting insert attachment bolt therein, and said cutting insert includes a cutting insert attachment bolt passage generally centrally disposed therethrough.

11. The boring bar according to claim 7, wherein said insert pocket is polygonal and said cutting insert is polygonal and congruent to said insert pocket.

12. The boring bar according to claim 7, wherein said insert pocket is triangular and said cutting insert is triangular and congruent to said insert pocket.

13. The boring bar according to claim 7, wherein said sides and said base of said insert pocket are equal in length to one another, with said insert pocket forming an equilateral triangle, and said cutting insert forms an equilateral triangle having three equal sides all serving as cutting edges, with said cutting insert installable within said insert pocket with any of said cutting edges depending from said insert pocket and said working end of said shaft.

14. A boring bar, comprising:

a rotary shaft having a rotary axis, a direction of rotation therearound, and a working end;

said working end including a solid portion and a truncated relief portion, with said solid portion having a relief surface adjacent said relief portion;

said relief surface having a trailing portion relative to said direction of rotation disposed to one side of said axis and a leading portion disposed laterally opposite said trailing portion, said relief surface having a lower edge defined by a secant of said working end, said lower edge having a forward end and an opposite rearward end; and said relief surface including a cutting insert pocket formed therein, said insert pocket having an upper end and a face defined by a plurality of sides and a base extending across and a lower outer corner and a lower inner corner at least said trailing portion of said relief surface, each of said sides sloping inwardly with respect to said face to define an upper edge which is narrower than said face, said lower outer corner disposed forwardly of said lower inner corner to define a positive radial rake angle, said insert pocket for removably retaining a cutting insert in a position rearwardly of said solid portion and forwardly of said relief portion relative to said direction of rotation of said rotary shaft and having said positive radial rake angle; whereby a compressive force is provided by rotation of said shaft which securely holds the cutting insert within said insert pocket.

* * * * *